(12) United States Patent
Zha et al.

(10) Patent No.: US 8,588,136 B2
(45) Date of Patent: Nov. 19, 2013

(54) SYSTEM AND METHOD FOR SSS DETECTION UNDER CARRIER FREQUENCY OFFSET IN AN ORTHOGONAL FREQUENCY-DIVISION MULTIPLE ACCESS DOWNLINK CHANNEL

(75) Inventors: Wei Zha, Germantown, MD (US); Amir Soltanian, Potomac, MD (US); Yuelun Guo, Germantown, MD (US); Wei Lu, Bethesda, MD (US)

(73) Assignee: PCTEL, Inc., Bloomingdale, IL (US)

( * ) Notice: Subject to any disclaimer, the term of this patent is extended or adjusted under 35 U.S.C. 154(b) by 482 days.

(21) Appl. No.: 12/763,482

(22) Filed: Apr. 20, 2010

(65) Prior Publication Data

US 2011/0255394 A1    Oct. 20, 2011

(51) Int. Cl.
*H04W 4/00* (2009.01)
(52) U.S. Cl.
USPC .......................................................... 370/328
(58) Field of Classification Search
None
See application file for complete search history.

(56) References Cited

U.S. PATENT DOCUMENTS

| | | | |
|---|---|---|---|
| 2008/0043702 A1* | 2/2008 | Moon et al. | 370/342 |
| 2008/0101511 A1* | 5/2008 | Lindoff et al. | 375/347 |
| 2008/0205375 A1 | 8/2008 | Onggosanusi et al. | |
| 2009/0196279 A1 | 8/2009 | Kim et al. | |
| 2010/0091702 A1* | 4/2010 | Luo et al. | 370/328 |

OTHER PUBLICATIONS

International Search Report and Written Opinion issued in PCT Application PCT/US2011/033210, mailed on Dec. 28, 2011.
International Preliminary Report on Patentability issued in PCT Application No. PCT/US2011/033210, mailed on Nov. 1, 2012.

* cited by examiner

*Primary Examiner* — Yong Zhou
(74) *Attorney, Agent, or Firm* — The Marbury Law Group, PLLC

(57) ABSTRACT

A system and method for SSS detection under carrier frequency offset in an orthogonal frequency-division multiple access (OFDMA) downlink channel. A processor receives a signal sample that includes a transmission on a primary synchronization signal (PSS) and a transmission on a one secondary synchronization signal (SSS). The processor determines a correlation "P" of a first symbol transmitted in the PSS of the signal sample to a first known symbol at each time "t" of time increments k of the signal sample and a correlation "S" of a second symbol transmitted in the a SSS to a second known symbol at each time t-.5/7 msecs. The processor receives a candidate phase rotation of $\theta_i$ from a set of "i" candidates and determines a correlation "Cmax" over the time increments k representing a maximum amplitude of a combined correlation of S and P, with P rotated by $\theta_i$. The processor determines the cell identifier from the first and second known symbols that produced S and P of C max and an estimation of the frequency offset between a transmitter of the signal sample and a receiver of the signal sample.

13 Claims, 7 Drawing Sheets

(a) Before phase rotation combination (b) With phase rotation of $\theta$, $2\theta$, and $3\theta$, for $Sb$, $Pa$ and $Pb$

SYSTEM AND METHOD FOR SSS DETECTION UNDER CARRIER FREQUENCY OFFSET IN AN ORTHOGONAL FREQUENCY-DIVISION MULTIPLE ACCESS DOWNLINK CHANNEL

BACKGROUND

The Long Term Evolution (LTE) standard under consideration by the 3rd Generation Partnership Project (3GPP), the signal bandwidth may be configured from 1.4 MHz to 20 MHz. LTE uses orthogonal frequency-division multiple access (OFDMA) as the downlink channel. The bandwidth of the channel can be configured to 1.4 MHz, 3 MHz, 5 MHz, 10 MHz, 15 MHz and 20 MHz.

A cell search is a process by which a receiver acquires time and frequency synchronization with a cell and detects the physical layer cell ID of that cell. In LTE systems, this process is facilitated by the use of a primary sync signal (PSS) and secondary sync signal (SSS) (sometimes also referred to as the primary sync channel PSCH and the SSCH secondary sync channel respectively). Synchronization signals are specific sequences inserted into the last two OFDM symbols in the first slot of sub-frame zero and five (slots number 0 and 10). The PSS is carried on the PSS channel and the secondary sync signal is carried on the SSS channel. The primary synchronization signal is typically used for timing and frequency acquisition whereas the secondary signal is typically used to acquire the Cell ID and other cell-specific information. Both the PSSC and the SSSC are located in a 960 kHz band at the center of the signal and arrive in a symbol every 5 ms. There are 3 possibilities of PSS and 168 possibilities of SSS. Thus, there are 3*168=504 possibilities each of which is referred to as a Cell ID.

The Cell ID in the LTE system is composed of two parts, Nid1 and Nid2, where the Cell ID is calculated as Nid=Nid1*3+Nid2. The PSS (primary synchronization signal) corresponds to one of the three Nid2 codes, and the SSS (secondary synchronization signal) corresponds to one of the 168 Nid1 codes. The PSS symbol follows the SSS symbol in the LTE signal.

Synchronization (or acquisition) in an LTE system is a two-step procedure defined by the LTE standard specification. The first step is PSS detection to detect a time offset (frame timing) and Nid2, and the second step is SSS detection to select the Nid1 that has the maximum correlation energy.

Correlation is used to indicate how closely the two signals are related. For example, if there are two sequences of data $X=[x_1, x_2, \ldots, x_L]$ and $Y=[y_1, y_2, \ldots, y_{L+M}]$, wherein X is the reference sequence of L samples long, and Y is the received sequence of L+M samples long, to be correlated with X. The correlation between X and Y at time shifts k of Y is defined in Equation 1:

$$\rho(k) = \sum_{i=1}^{L} y_{i+k} * conj(x_i), k = 0, \ldots, M-1. \quad [1]$$

Figure 1:
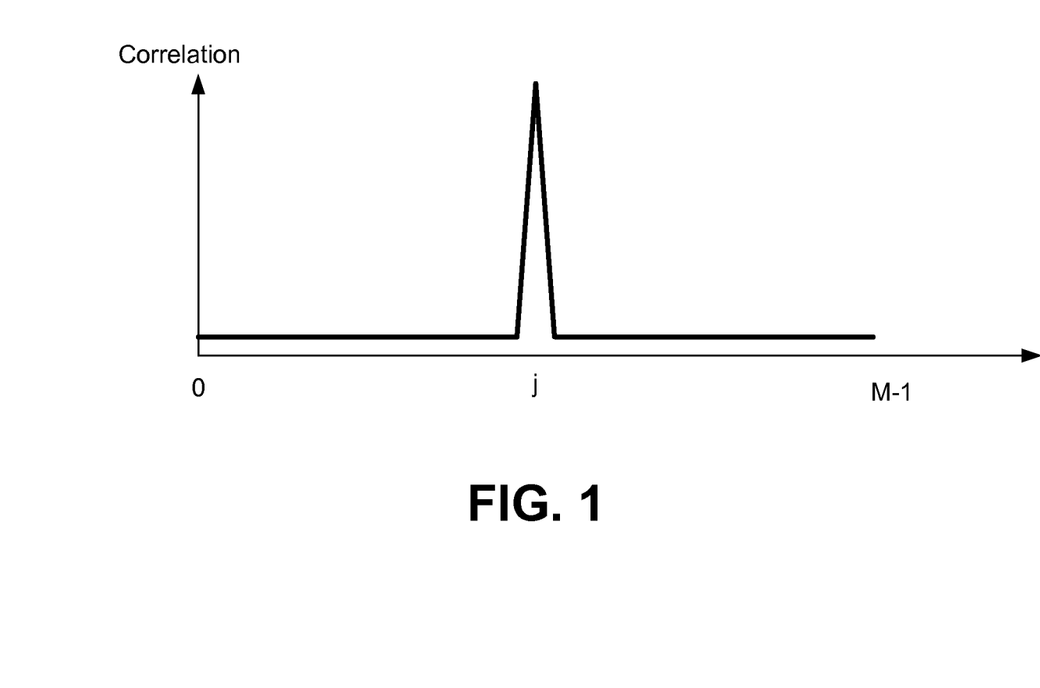
FIG. 1 illustrates a correlation result of a signal at delay j.

In our example, X is the PSS or SSS reference signal sampled in the time domain, Y is the received signal of X through a communication channel that is characterized by a time delay j and amplitude a. Y has the form $Y=[0,0, \ldots, 0, ax_1, ax_2, \ldots, ax_L, 0, \ldots, 0]$. As PSS and SSS sequences are designed to have a good self-correlation property, the correlation output will appear as illustrated in FIG. 1, with a peak correlation at the delay j and low correlation elsewhere. Therefore, correlation is widely used to test if a known reference signal is present in the received signal at a specific delay.

In the case of the PSS and the SSS, the delay identifies the timing of the arrival of the PSS signal and permits the SSS signal to be located. Using the timing and the cell ID, the receiver synchronizes with the base station transmitter.

With respect to the detection of the SSS, the typical approach is to use only the SSS correlation to find the SSS. This approach discards information that may be obtained from the correlation of the PSS and is not always satisfactory under real-world conditions.

In a typical wireless communication system, the signal to be transmitted is upconverted to a carrier frequency prior to transmission. The receiver is expected to tune to the same carrier frequency for down-converting the signal to baseband prior to demodulation. However, under real-world conditions, the carrier frequency of the receiver may not be the same as the carrier frequency of the transmitter. When this happens, the received baseband signal, instead of being centered at DC (0 MHz), will be centered at a frequency offset from the desired center frequency.

Using existing systems, the acquisition detection may experience a loss of more than 2.0 dB when the carrier frequency offset is ±2.5 KHz. One possible cause of such loss may be the acquisition algorithm that is used.

SUMMARY

Embodiments of the present application provide systems and methods for detecting the SSS in an LTE environment affected by frequency offset. Other embodiments are directed to using the correlation of P and S to obtain an estimate of the frequency offsets at a receiver.

In an embodiment, an SSS detection module uses correlation of both the PSS and the SSS to identify an SSS while accounting for frequency offsets between a base station and a receiver.

DETAILED DESCRIPTION

In an LTE environment, information is transmitted as symbols encoded in the phase of the transmitted signal with respect to its carrier. For proper extraction of the symbols, therefore, the receiver's local reference must be quite close in frequency to the carrier signal; a frequency difference causes the apparent phase relationship to "rotate" undesirably. Thus, the effects of frequency offsets may be described in terms of phase rotations of the signal from an ideal signal.

Figure 2A:
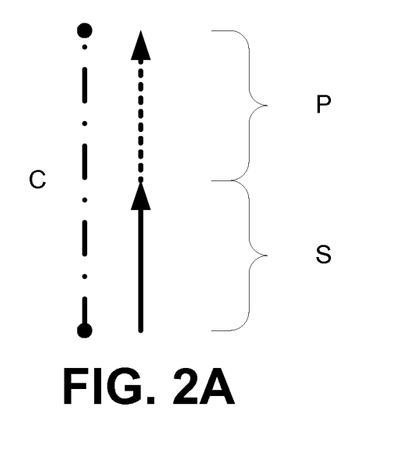
FIG. 2A is a vector diagram illustrating the use of both the PSS and SSS correlations to obtain a combined correlation where no frequency offset is present according to an embodiment.

As previously noted, the PSS and SSS symbols are adjacent in the LTE signal. FIG. 2A is a vector diagram illustrating the use of both the PSS and SSS correlations to obtain a combined correlation where no frequency offset is present according to an embodiment. In this embodiment, the PSS correlation is combined with SSS correlation to improve the detection of the SSS. This coherent combining is equivalent to a correlation with double the length, which improves the performance by 3 dB.

Figure 2B:
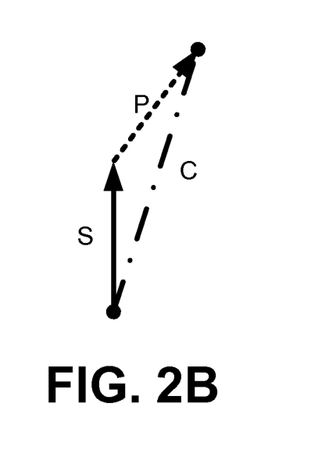
FIG. 2B is a vector diagram illustrating the affect on the combined correlation of a frequency offset is present according to an embodiment.

However, this combining alone does not account for carrier frequency offset. FIG. 2B is a vector diagram illustrating the affect on the combined correlation when a frequency offset is present according to an embodiment.

In mathematical terms, the PSS correlation may be represented by P, SSS correlation may be represented by S, and the combined correlation may be represented by C. The following Equation describes a coherent combining method:

$$C = P + S = P * \exp(j*0) + S \qquad [2]$$

where P is the PSS correlation, $\exp(j*0)$ is the phase rotation of P by zero degrees (no phase rotation), and S is the SSS correlation. P and S are added together without considering frequency offset introduced phase rotation. Note that in Equation 2 above, P, S and C are complex numbers.

In an embodiment, the combined correlation is corrected for frequency offset by applying a rotation to correlation P.

Each LTE FDD frame is 10 msec in length. Each frame is divided into 20 slots. Thus, each slot is 0.5 msec in length. For a normal CP LTE signal, each slot contains 7 OFDM symbols. The PSS and SSS are carried on adjacent OFDM symbols. Thus, the time difference between the two OFDM symbols is the time for one symbol or 0.5 msec/7. For a frequency offset of ±2.5 KHz, the phase difference between these two OFDM symbols is 0.5 msec/7*±2.5 KHz*2π=±2.5π/7=±0.357π. This phase rotation corresponds to $\exp(j*\pm 0.357\pi)$= 0.4339±0.9010i.

Assuming that P and S have the same amplitude, then the combined correlation is proportional to 1.4339±0.9010i, as illustrated in FIG. 2B. Under 0 Hz frequency offset, the combined correlation is proportional to 2.0+0.0i. The loss at ±2.5 KHz can be calculated to be 20*log(abs(2.0+0.0i)/abs (1.4339±0.9010i))=1.45 dB.

Figure 3:
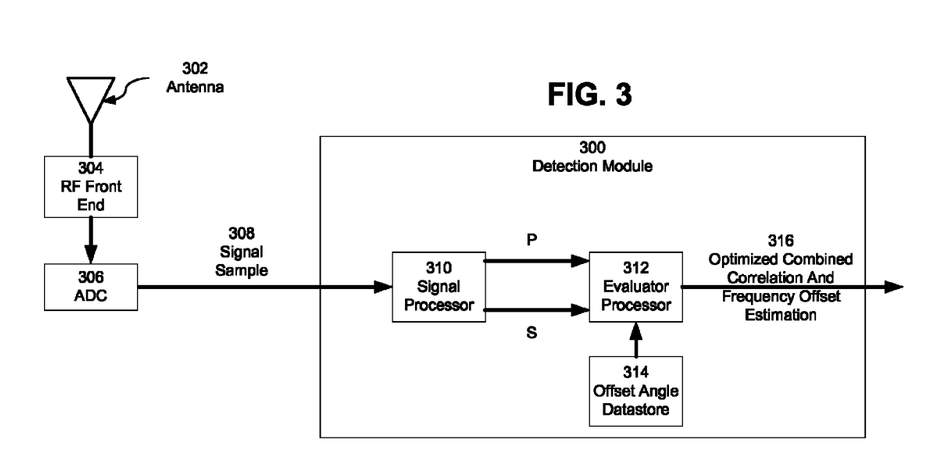
FIG. 3 is a block diagram illustrating the use of a detection module to optimize a combined correlation when a frequency offset is present according to an embodiment.

FIG. 3 is a block diagram illustrating the use of a detection module to optimize a combined correlation when a frequency offset is present according to an embodiment.

An RF (radio frequency) wireless LTE signal is received by an antenna 302. A radio frequency (RF) front-end 304 downconverts the signal from RF to baseband. The analog baseband signal is converted to a digital signal by an analog-to-digital converter (ADC) 306 to produce a sample signal 308.

In an embodiment, signal sample 308 is 15 msec of LTE signal. PSS and SSS appears in the LTE signal every 5 msec. Thus, the sample signal contains three occurrences of PSS and SSS. The detection module 300 comprises a signal processor 310 that determines values for the PSS correlation (P) and SSS correlation (S). The detection module 300 further comprises an evaluator processor 312 that combines S with "N" rotated versions of P and selects the maximum combined correlation value C 316 according to Equation [3]:

$$C = \max_i \{abs(P * \exp(j * \theta_i) + S)\}. \qquad [3]$$

Equation [3] represents the operation in FIG. 2B, where P is the PSS correlation, $\exp(j*\theta_i)$ is the phase rotation of P by angle $\theta_i$, and S is the SSS correlation. P and S are thus added together considering the frequency offset introduced phase rotation. There are i possible candidate phase rotations. The one that produces the maximum norm (amplitude) for the combined correlation is selected as the best choice, and its resulting combined correlation is output as C.

In an embodiment, the "i" candidate phase rotations may be selected by the user of the detection module 300 from a datastore 314. As illustrated, i=5 and the candidate phase rotations are ±2π/7, ±π/7, and 0. These five phase rotations −2π/7, −π/7, 0, π/7 and 2π/7 correspond to frequency offsets of 2 KHz, 1 KHz, 0 Hz, −1 KHz and −2 KHz. The middle point between −2π/7 and −π/7 is −1.5π/7, which corresponds to 1.5 KHz. Thus, each of the five candidate phase rotations in this example covers a ±0.5π/7 window around it. If we connect the five windows together, the candidate rotations cover ±2.5π/7, or equivalently ±2.5 KHz. These rotation angles correct ("de-rotate") a frequency offset between −2.5 KHz and 2.5 KHz. The candidate phase rotation that "corrects" the phase of P such that the correlation of P and S is maximized represents the frequency offset that is being experienced by the receiver.

The determination of an optimum correlation using candidate phase rotations may also be used to provide an estimation of the frequency offset at a particular receiver (see, FIG. 3, block 316). The five phase rotations −2π/7, −π/7, 0, π/7 and 2π/7 in the previous example correspond to frequency offsets estimates of 2 KHz, 1 KHz, 0 Hz, −1 KHz and −2 KHz.

The signal processor 310, the evaluator processor 312 and the datastore 314 are illustrated in FIG. 3 as discrete components. However, the functions of these elements may be performed by a single DSP chip or by one or more FPGAs or ASICs. Alternatively, the computationally intensive signal processor 210 may be implemented on an FPGA and the computationally less intensive functioning blocks (the evaluator processor 312 and the datastore 314) on a DSP.

After synchronization (detecting time offset and Cell ID with PSS and SSS), an LTE receiver estimates the channel using the RS (Reference Signal) signals and performs data demodulation. If the original frequency offset is large, such as 1.2 kHz, the channel estimation using the RS cannot be performed on the received signal directly. The LTE RS is spaced 1 slot (0.5 msec) apart in time for the same subcarrier. Thus, the fine frequency offset estimation using the RS can only handle a frequency offset that is within ±1 kHz (1/0.5 ms=2 kHz corresponding to ±1 kHz range).

The above ±1 kHz frequency offset range may also include the Doppler frequency offset, which may be as large as ±0.3 kHz. Thus, the carrier frequency offset tolerance is reduced to within a ±0.7 kHz range.

The frequency offset estimate as determined above may be used to reduce a large frequency offset.

For example, let the actual frequency offset between transmitter and receiver be 1.2 kHz, the candidate phase rotation that produces $C_{max}$ will be −π/7. Since −π/7 corresponds to a frequency offset of 1 KHz, the frequency offset is estimate as 1 KHz.

The original signal with 1.2 KHz frequency offset is expressed by Equation 4:

$$r(t)=a(t)*\exp(-j2\pi(f_c+1200)t), \quad [4]$$

where $f_c$ is the carrier frequency, r(t) is the received signal at time t and a(t) is the amplitude at time t.

Using the frequency offset estimate of 1 KHz, the frequency difference can be reduced to 200 Hz as illustrated in Equation 5:

$$r'(t)=r(t)*\exp(j2\pi*1000t)=a(t)*\exp(-j2\pi(f_c+200)t) \quad [5]$$

As the residue frequency offset after reduction using the output of our process is within ±0.5 kHz range, it may be suited for channel estimation.

Figure 4A:
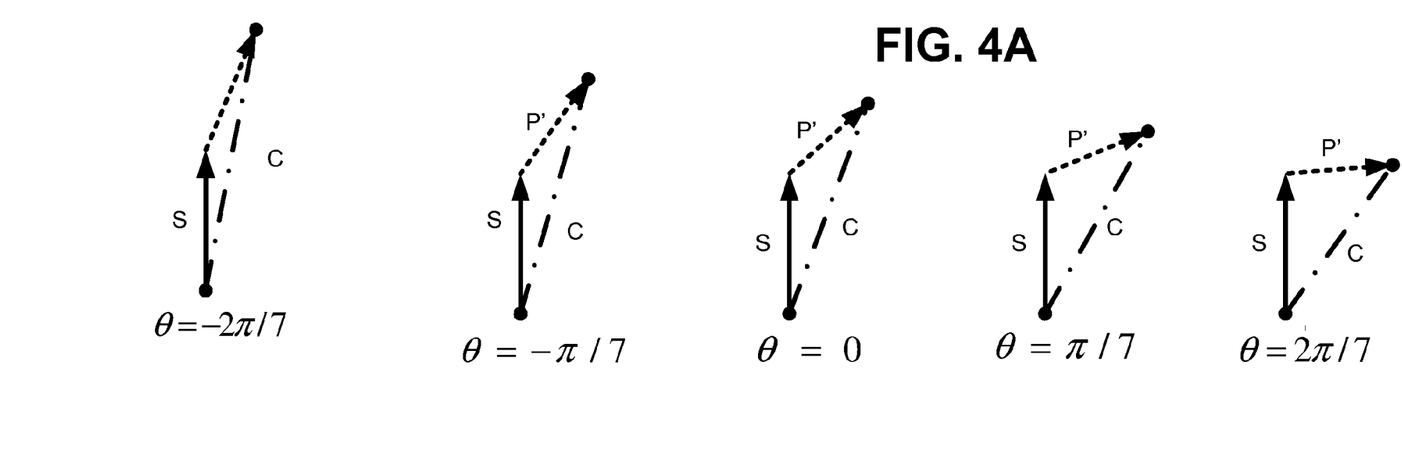
FIGS. 4A, B and C are vector diagrams illustrating the determination of a maximum combined correlation value C according to embodiments.
Figure 4B:
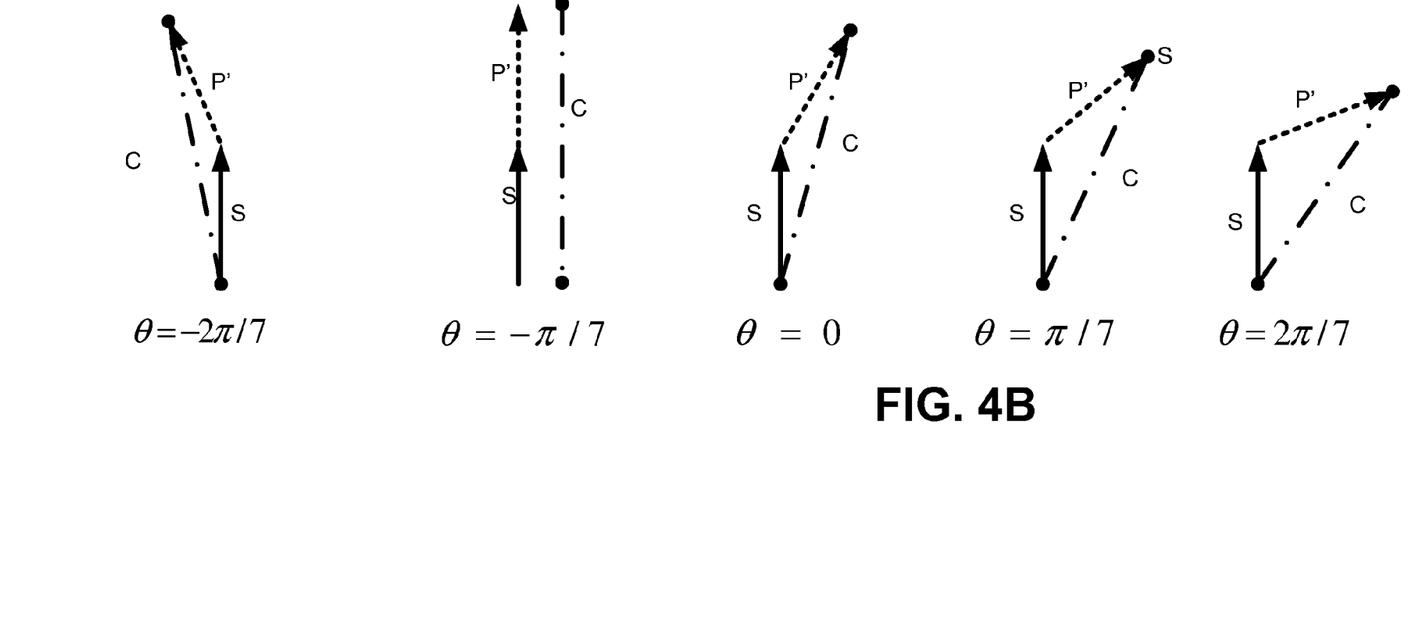
Figure 4C:
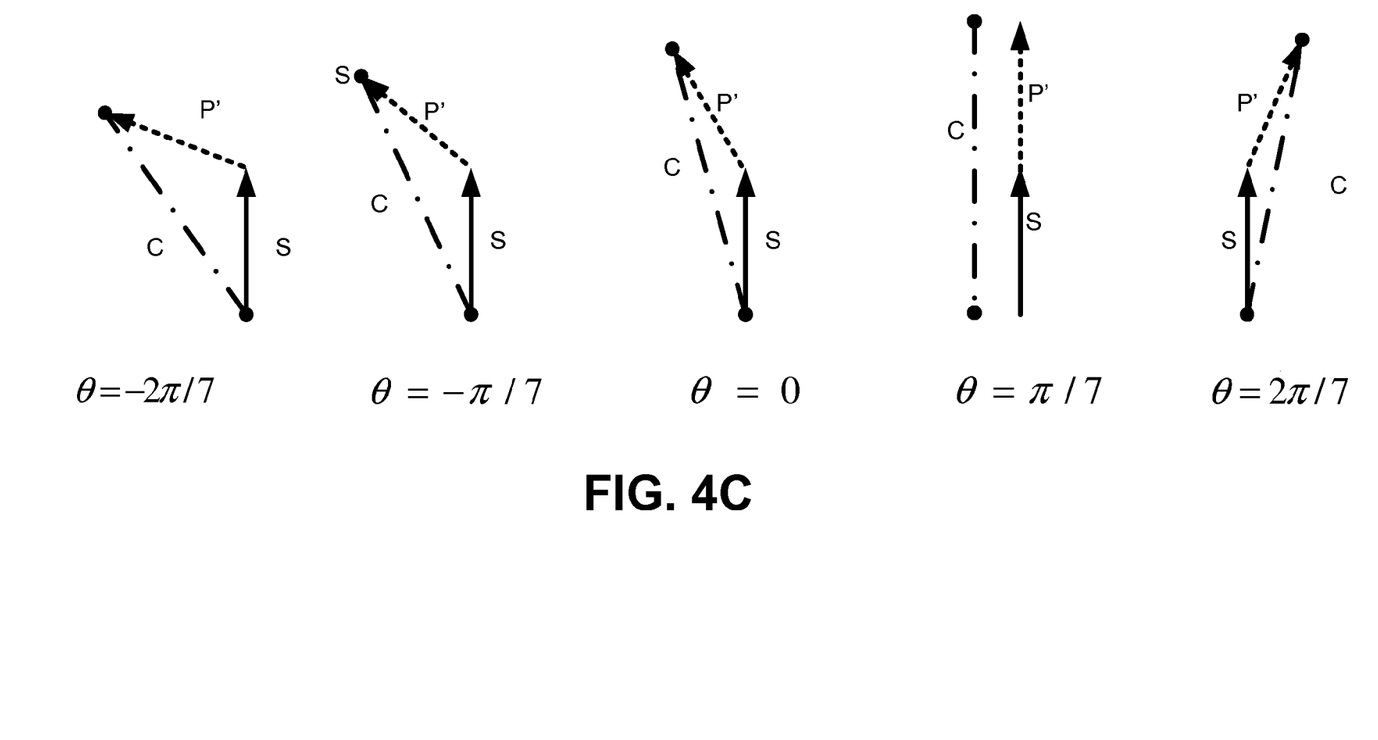

FIGS. 4A, B and C are vector diagrams illustrating the determination of a maximum combined correlation value C according to embodiments.

As illustrated in FIG. 4A, the maximum value of correlation C is reached when the offset angle is $-2\pi/7$, that is when P is rotated by $-2\pi/7$. In this example, P has a relative phase difference of $+2.57\pi/7$ compared to S, which is equivalent to an offset of 2.5 KHz.

As illustrated in FIG. 4B, the maximum value of correlation C is reached when the offset angle is $-\pi/7$, that is when P is rotated by $-\pi/7$. In this example, P has a relative phase difference of $\pi/7$ compared to S, which is equivalent to an offset of 1.0 KHz.

As illustrated in FIG. 4C, the maximum value of correlation C is reached when the offset angle is $+\pi/7$, that is when P is rotated by $+\pi/7$. In this example, P has a relative phase difference of $-\pi/7$ compared to S, which is equivalent to an offset of $-1.0$ KHz.

Figure 5:
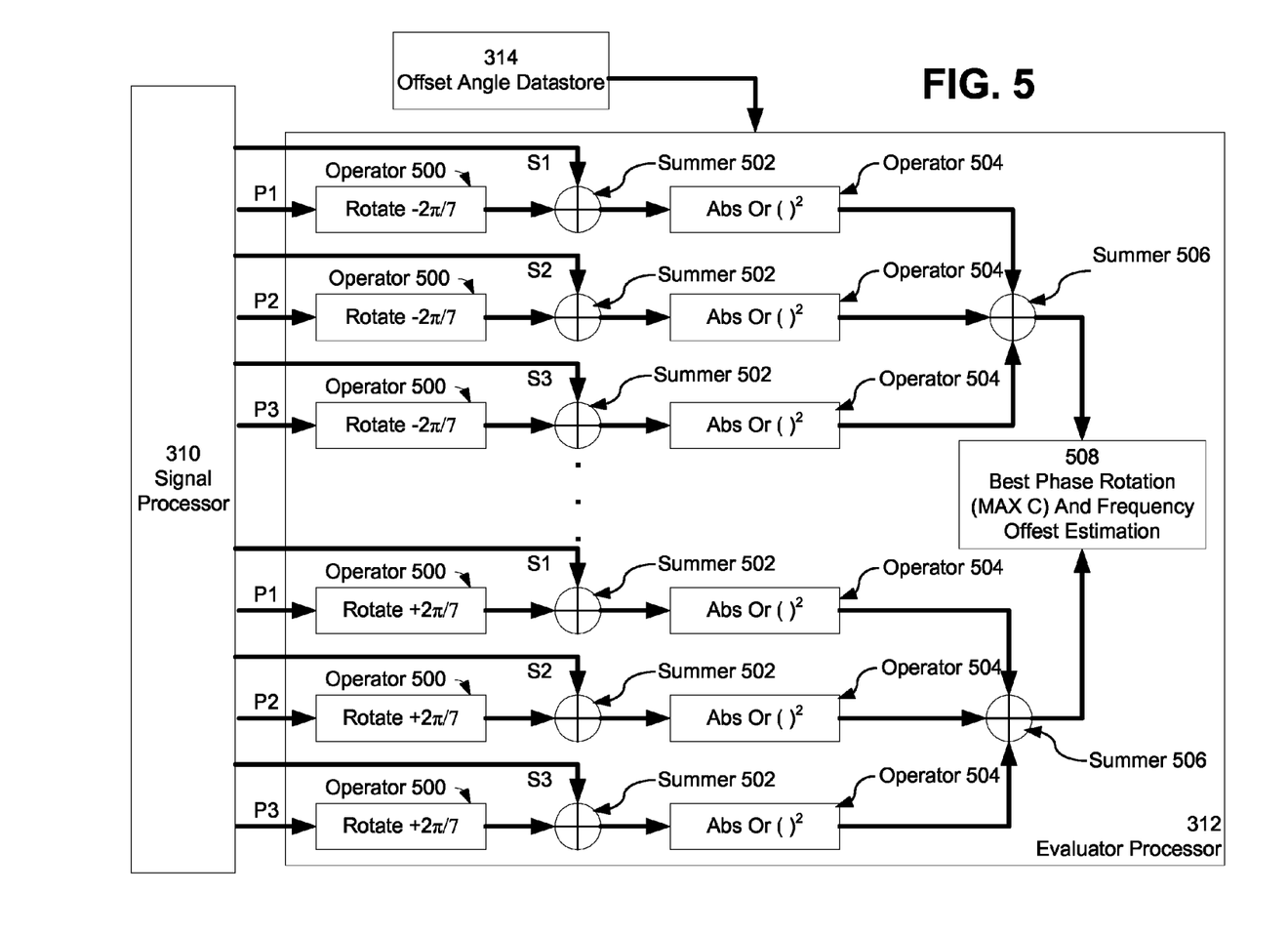
FIG. 5 is a block diagram illustrating the combination three correlations of P and S acquired in a single signal sample according to an embodiment.

FIG. 5 is a block diagram illustrating the combination three correlations of P and S acquired in a single signal sample according to an embodiment.

Since the phase of the noise is uniformly distributed between $-\pi$ and $\pi$, the algorithm described by Equation 3 may pick the phase rotation that aligns with the noise phase. As described above, in an embodiment, the sample signal is long enough to include three instances of a transmitted PSS signal. For example, if the sample is 15 msecs, the sample will include three instances of the PSS signal (identified herein as $P_1$, $P_2$ and $P_3$). $P_1$, $P_2$ and $P_3$ have the same phase rotation due to frequency offset. However the phase rotation of the noise components of these three signals will be uncorrelated. This property can be used to compensate for the noise.

Assuming a sample length of 15 msecs, the signal processor 310 provides samples (P1, S1), (P2, S2), and (P3, S3) to operators 500. The operators 500 receive candidate phase rotations from the datastore 314. As illustrated, the candidate phase rotations are in a range from $-2\pi/7$ to $+2\pi/7$. However, this range is provided for illustration purposes only and is not meant as a limitation. In general terms, for each of "R" signal samples and "i" candidate phase rotations, $C_i$ is evaluated at summers 502 using Equation 6:

$$C_i=Abs(P_1*\exp(j*\theta_i)+S_1)+\ldots ABS(P_R*\exp(j*\theta_i)+S_R) \quad [6]$$

The absolute value or the square of $C_i$ is determined by operators 504. As illustrated in FIG. 5, the values for "C" of the three (R=3) signal samples (P1, 51), (P2, S2), and (P3, S3) at the candidate rotation angle are summed at summers 506. This sum represents the correlation "$C_i$" at a particular candidate angle that has been compensated for noise.

The process is repeated for each of the candidate rotation angles and a maximum "Cmax" is determined from all of the $C_i$ values determined over the R signal samples and the i candidate phase rotations. Cmax, in this embodiment, represents a noise compensated correlation value as well as an estimation of the frequency offset (block 508).

Because the phases of noise for the three observations are uniformly distributed between $-\pi$ and $\pi$ and uncorrelated, the probability that all three noise align in the same direction is very small, and thus the noise contribution is greatly reduced.

The square of the norm may typically be calculated on a signal processor 310 of the detection module 300 more efficiently than the norm itself. In an embodiment in which i=5 and R=3, Equation 3 may be replaced with Equation 7 below with little performance loss:

$$C = \max_{i=1}^{5} \left\{ \begin{array}{l} (P_1*\exp(j\theta_i)+S_1)*conj(P_1*\exp(j\theta_i)+S_1)+ \\ (P_2*\exp(j\theta_i)+S_2)*conj(P_2*\exp(j\theta_i)+S_2)+ \\ (P_3*\exp(j\theta_i)+S_3)*conj(P_3*\exp(j\theta_i)+S_3) \end{array} \right\} \quad [7]$$

It may be observed that the gain achievable with this approach is results from searching the actual phase rotation caused by frequency offset. In an embodiment, the search is performed on five discrete points from $-2\pi/7$ to $2\pi/7$, while the random noise phase is from $-\pi$ to $\pi$, and also comes from the combination of three observations. If the maximum possible frequency offset is less than ±2.5 KHz, then the search window can be made smaller to improve the performance.

For ±2.5 KHz frequency offset, the phase rotation between adjacent symbols in extended CP (cyclic prefix) length LTE is $\pm 2.5\pi/6 = \pm 0.417\pi$. As this phase rotation is not much different from the phase rotation of $\pm 0.357\pi$ for normal CP length LTE, the performance of the algorithm is comparable to the normal CP case. In an embodiment, the candidate phase rotations for extended CP length LTE are $\pm\pi/3$, $\pm\pi/6$, and 0. The worst case loss can be calculated to be $20*\log(abs(2.0+0.0i)/abs(1+\exp(j*\pm\pi 0.5/6))=20*\log(abs(2.0+0.0i)/abs(1.9659\pm 0.2588 i))=0.075$ dB.

When the frequency offset gets larger, there is performance loss in calculating the PSS and SSS correlations P and S, as the correlation is calculated assuming zero frequency offset for the length of correlation. However, as the frequency offset gets larger, this assumption no longer holds. The loss at 2.5 KHz frequency offset is estimated to be about 0.5 dB.

Also from the above description of the proposed algorithm, the search window will become wider for large frequency offset, and eventually the search window will be from $-\pi$ to $\pi$ and thus render the described algorithm with no gain.

Figure 6:
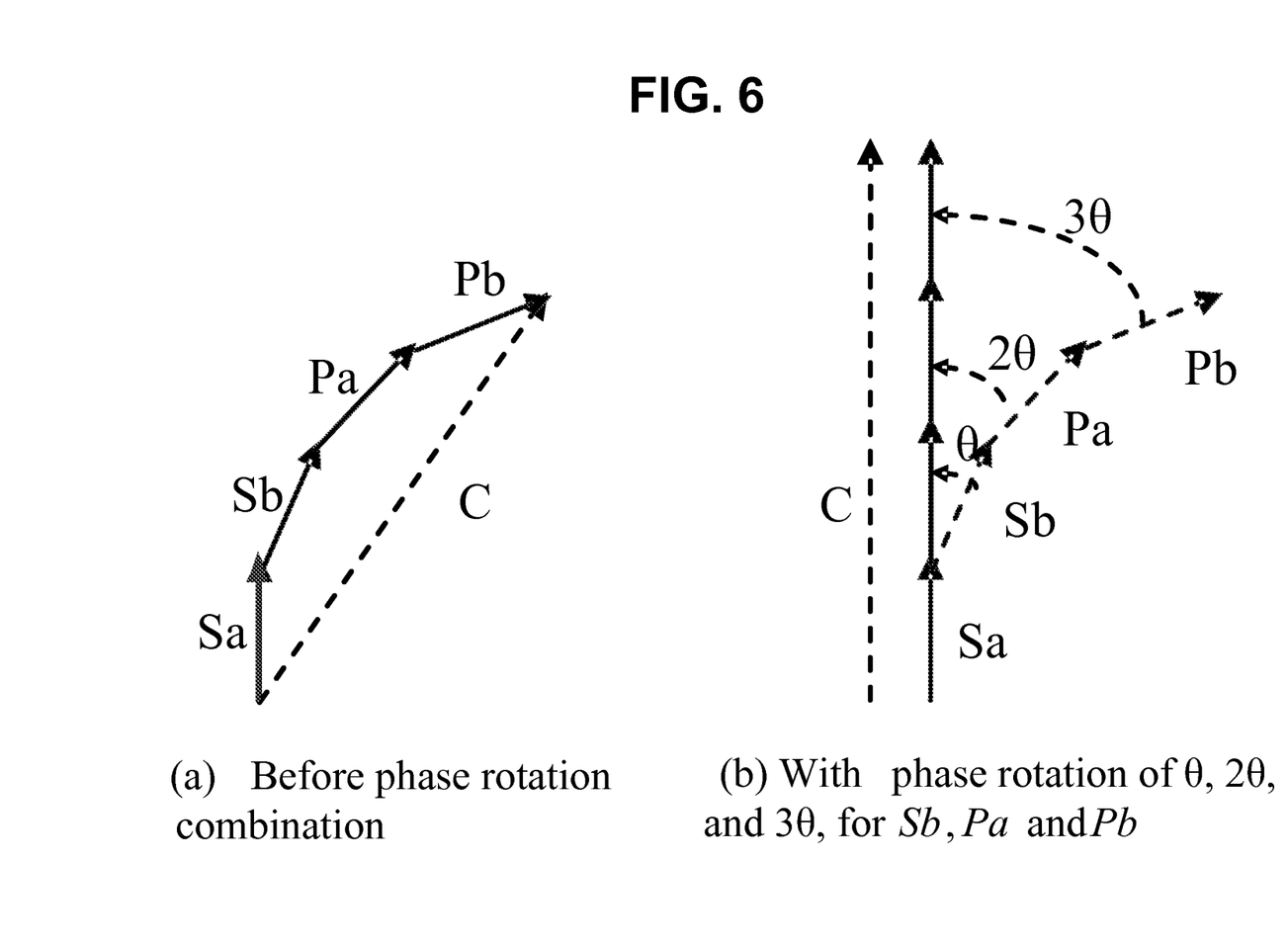
FIG. 6 is a vector diagram illustrating the determination of a maximum combined correlation value C in view of a large frequency offset according to embodiments.

In an embodiment, a detection module is configured to divide the correlation for PSS and SSS into smaller segments such as Sa, Sb, Pa and Pb (correlation length is halved) in increasing time order. In this embodiment, the four segments are combined with candidate phase rotations as illustrated in FIG. 6 and represented by Equation 8:

$$C = \max_i \{abs(Pb*\exp(j*3\theta_i)+Pa*\exp(j*2\theta_i)+Sb*\exp(j*\theta_i)+Sa)\} \quad [8]$$

The phase rotation at ±2.5 KHz between adjacent segments is halved to $\pm 2.5\pi/14$ and the phase rotation steps to search are now $\pm 2\pi/14$, $\pm\pi/14$, and 0. These phase rotations of $\pm 2\pi/14$, $\pm\pi/14$, and 0 correspond to frequency offset of ±2 KHz, ±1 KHz, and 0 Hz. The phase rotation that gives the maximum correlation also gives the estimated frequency offset.

The PSS detection process may use the original two-segment combining algorithm to combine Pa and Pb:

$$P = \max_i \{abs(Pb * \exp(j * \theta_i) + Pa)\} \quad [9]$$

For simplicity of algorithm description, Equation 9 uses only one data observation. However, when multiple data observations are available, the previous combining algorithm for independent observations may be used.

For even higher freq offsets, the correlation can be divided into 8 segments, 16 segments and etc, depending on the maximum possible frequency offset, the required performance gain and the available computation resources. For example, for the same maximum frequency offset, dividing into 16 segments would provide better performance but at more computations required. There are diminishing returns to dividing into more segments, so a tradeoff can be made that can achieve reasonable performance at reasonable cost.

Since the phase rotations are symmetric such as $\pm 2\theta$, $\pm \theta$, and 0, the complex multiplication associated with the phase rotation can be reused in a manner similar to the butterfly operations as in a fast Fourier transform (FFT) to reduce computation.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A method for obtaining a cell identifier in an orthogonal frequency-division multiple access (OFDMA) transmission, comprising:

receiving a signal sample at a processor, wherein the signal sample comprises a primary synchronization signal (PSS) and a secondary synchronization signal (SSS);

correlating at the processor each of a set of first known symbols with the PSS to generate a plurality of correlation "P" values;

correlating at the processor each of a set of second known symbols with the SSS to generate a plurality of correlation "S" values;

selecting at the processor a number "n" of "i" candidate phase rotations "$\exp(j*\theta_i)$", where n>1;

determining at the processor a correlation "C" value for each combination of the plurality of P values with the plurality of S values at each selected candidate phase rotation, for each combination of P and S values, selecting at the processor a maximum C value "Cmax" from among the determined C values, where Cmax is equal to $$\max_{i=1}^{n} \{abs(P * \exp(j * \theta_i) + S)\};$$

and determining at the processor the cell identifier based at least in part on the first and second known symbols correlated with the PSS and the SSS to generate the combination of P and S values resulting in the selected $C_{max}$ having a maximum correlation energy.

2. The method of claim 1, wherein the number "n" is five, and wherein the candidate phase rotations "exp(j*$\theta_i$)" are $-2\pi/7$, $-2\pi/7$, $0$, $\pi/7$ and $2\pi/7$.

3. The method of claim 1 further comprising:
determining at the processor an estimated frequency offset equal to the selected candidate phase rotation resulting in the selected Cmax.

4. The method of claim 3, further comprising:
sending the estimated frequency offset to a receiver;
applying at the receiver the estimated frequency offset to a signal to produce a corrected signal with a reduced frequency offset; and
performing channel estimation at the receiver using the corrected signal.

5. A method for obtaining a cell identifier in an orthogonal frequency-division multiple access (OFDMA) transmission comprising:

receiving a signal sample at a processor, the signal sample comprising a number "R" instances of a primary synchronization signal (PSS) and instances of a secondary synchronization signal (SSS), each of the instances of the PSS in the signal sample being associated with one instance of the SSS in the signal sample, and the number R being greater than or equal to two;

correlating at the processor each of a set of first known symbols with each of the instances of the PSS to generate a plurality of sets of "R" correlation "P" values "$P_1 \ldots P_R$";

correlating at the processor each of a set of second known symbols with each of the instances of the SSS to generate a plurality of sets of "R" correlation "S" values, "$S_1 \ldots S_R$";

selecting at the processor a number "n" of "i" candidate phase rotations "exp(j*$\theta_i$)", where n>1;

generating at the processor a correlation "$C_i$" value for each combination of the sets of "$P_1 \ldots P_R$" values with the sets of "$S_1 \ldots S_R$" values at each candidate phase rotation, "i", wherein $C_i$ is a complex number equal to $C_i$=Abs($P_1$*exp($j$*$\theta_1$)+$S_1$)+ ... ABS($P_R$*exp($j$*$\theta_1$)+$S_R$);

for each combination of a set of "$P_1 \ldots P_R$" values and a set of "$S_1 \ldots S_R$" values, selecting at the processor a maximum $C_i$ value "Cmax" from among the determined $C_i$ values; and determining at the processor the cell identifier based at least in part on the first and second known symbols correlated with the instances of the PSS and SSS to generate the combination of the set of "$P_1 \ldots P_R$" values and the set of "$S_1 \ldots S_R$" values resulting in the selected Cmax having a maximum correlation energy.

6. The method of claim 5, wherein the number "n" is five, and
wherein the candidate phase rotations "exp(j*$\theta_i$)" are $-2\pi/7$, $-2\pi/7$, $0$, $\pi/7$ and $2\pi/7$.

7. The method of claim 5, further comprising:
determining at the processor an estimated frequency offset equal to the selected candidate phase rotation resulting in the selected Cmax.

8. The method of claim 7, further comprising:
sending the estimated frequency offset to a receiver;
applying at the receiver the estimated frequency offset to a signal to produce a corrected signal with a reduced frequency offset; and
performing channel estimation at the receiver using the corrected signal.

9. The method of claim 5, wherein $C_i$ is a complex number equal to $$C_i = \left\{ \begin{array}{l} (P_1 * \exp(j\theta_i) + S_1) * conj(P_1 * \exp(j\theta_i) + S_1) + \ldots + \\ (P_R * \exp(j\theta_i) + S_R) * conj(P_R * \exp(j\theta_i) + S_R) \end{array} \right\}.$$

10. A method for obtaining a cell identifier in an orthogonal frequency-division multiple access (OFDMA) transmission comprising:

receiving a signal sample at a processor, wherein the signal sample comprises a primary synchronization signal (PSS) and a secondary synchronization signal (SSS);

correlating at the processor each of a set of first known symbols with a first half of the PSS to generate a plurality of correlation "Pa" values;

correlating at the processor each of the set of first known symbols with a second half of the PSS to generate a plurality of correlation "Pb" values;

correlating at the processor each of a set of second known symbols with a first half of the SSS to generate a plurality of correlation "Sa" values;

correlating at the processor each of the set of second known symbols with a second half of the SSS to generate a plurality of correlation "Sb" values;

selecting at the processor a number "n" of "i" of candidate phase rotations "exp(j*$\theta_i$)", "exp(j*2$\theta_i$)", and "exp(j*3$\theta_i$)", where n>1;

determining at the processor a correlation "C" value for a plurality of combinations of Pa values, Pb values, Sa values and Sb values at each of the candidate phase rotations for each combination of Pa, Pb, Sa and Sb values, selecting at the processor a maximum C value "Cmax" from among the determined C values, where Cmax is equal to $$C = \max_{i} \{abs(Pb * \exp(j * 3\theta_i) + Pa * \exp(j * 2\theta_i) + Sb * \exp(j * \theta_i) + Sa)\};$$

and determining at the processor the cell identifier based at least in part on the first and second known symbols correlated with the first and second half of the PSS and the first and second half of the SSS to generate the combination of Pa value, Pb value, Sa value and Sb value resulting in the selected Cmax having a maximum correlation energy.

11. The method of claim 10, wherein the number "n" is five, and
wherein the candidate phase rotations are $-2\pi/14$, $-2\pi/14$, 0, $\pi/14$ and $2\pi/14$.

12. The method of claim 11, further comprising:
determining at the processor an estimated frequency offset equal to the selected candidate phase rotation resulting in the selected Cmax.

13. The method of claim 12, further comprising:
sending the estimated frequency offset to a receiver;
applying at the receiver the estimated frequency offset to a signal to produce a corrected signal with a reduced frequency offset; and
performing channel estimation at the receiver using the corrected signal.

* * * * *